US008836677B2

(12) United States Patent
Li et al.

(10) Patent No.: US 8,836,677 B2
(45) Date of Patent: Sep. 16, 2014

(54) ARRAY SUBSTRATE AND DRIVING METHOD THEREOF

(75) Inventors: Meng Li, Shenzhen (CN); Jin-jie Wang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 207 days.

(21) Appl. No.: 13/379,998

(22) PCT Filed: Nov. 23, 2011

(86) PCT No.: PCT/CN2011/082766
§ 371 (c)(1),
(2), (4) Date: Dec. 21, 2011

(87) PCT Pub. No.: WO2013/075305
PCT Pub. Date: May 30, 2013

(65) Prior Publication Data
US 2013/0127796 A1 May 23, 2013

(30) Foreign Application Priority Data
Nov. 22, 2011 (CN) .......................... 2011 1 0373322

(51) Int. Cl.
*G06F 3/038* (2013.01)
*G09G 5/00* (2006.01)

(52) U.S. Cl.
CPC ........................................ *G09G 5/00* (2013.01)
USPC .............................. 345/204; 345/92; 345/100

(58) Field of Classification Search
USPC ............... 345/55, 84, 87, 89, 90, 92, 94, 100, 345/204, 690
See application file for complete search history.

(56) References Cited

U.S. PATENT DOCUMENTS 6,707,441 B1 * 3/2004 Hebiguchi et al. .............. 345/92
2004/0119672 A1 * 6/2004 Lee et al. ........................ 345/87
2008/0180589 A1 * 7/2008 Woo et al. ....................... 349/38
2009/0278776 A1 * 11/2009 Pai et al. ......................... 345/87

* cited by examiner

*Primary Examiner* — Koosha Sharifi-Tafreshi

(57) ABSTRACT

An array substrate and driving method thereof are described. The array substrate includes a gate driver, a source driver, a plurality of pixel regions and a switch unit. The pixel regions are composed of an array configuration in form of rows and columns wherein each of the pixel regions is connected to a secondary data line and two scan lines. The switch unit is coupled to the source driver via a plurality of primary data lines and coupled to the pixel regions via the secondary data lines wherein one of the primary data lines corresponds to one secondary data line in one pixel region and to another secondary data line in another pixel region adjacent to the one pixel region by the switch unit.

7 Claims, 4 Drawing Sheets

100

200

ARRAY SUBSTRATE AND DRIVING METHOD THEREOF

FIELD OF THE INVENTION

The present invention relates to a substrate and driving method thereof, and more particularly to an array substrate and driving method thereof applicable to liquid crystal display (LCD) for decreasing the components used in the source driver of the array substrate to reduce the manufacturing cost of LCD panel.

BACKGROUND OF THE INVENTION

Because the LCD has the features of low radiation, small size and low power consumption, the conventional cathode ray tube (CRT) display is gradually replaced by LCD panel which is widely used in a variety of products including notebook computer, personal digital assistant (PDA), flat television and mobile phone etc.

FIG. 1 is a schematic view of conventional driving circuit of LCD panel 100. The LCD panel 100 includes n (n being positive integer) scan lines 102*g* and 3m (m being positive integer) data lines 102*d* and the scan lines are interlaced with the data lines to form pixel unit having three sub-pixel regions 106. Each of the sub-pixel regions 106 has a thin film transistor (TFT) 110 and a pixel electrode 108 coupled to the TFT 110.

When the resolution of LCD panel 100 is "m×n" and each pixel region is driven by one gate in the LCD panel 100, the fan-out amount of the gate and the fan-out amount of the source are n and 3m, which represents n scan lines and 3m source. If the channel amount in one gate is "a" ("a" being positive integer) and the channel amount in each source is "b" ("b" being positive integer), the component amount of gate driver is n/a and the component amount of source driver 3m/b wherein "/" means division. When the resolution of LCD panel 100 is increased, the fan-out amount of the source is reduced and the component amount of the source driver is thus disadvantageously increased. Person skilled in the art should be noted that the cost of source driver is increased to spend a lot of manufacturing cost of LCD panel while the resolution is higher.

Consequently, there is a need to develop a novel array substrate to reduce the manufacturing cost of the LCD panel.

SUMMARY OF THE INVENTION

One objective of the present invention is to provide an array substrate and driving method thereof to save the manufacturing cost of the LCD panel.

According to the above objective, the present invention sets forth an array substrate and driving method thereof. The array substrate applicable to LCD panel includes a gate driver, a source driver, a plurality of pixel regions and a switch unit. The pixel regions are composed of an array configuration in form of rows and columns wherein each of the pixel regions is connected to a secondary data line and two scan lines. The switch unit is coupled to the source driver via a plurality of primary data lines and coupled to the pixel regions via the secondary data lines wherein one of the primary data lines corresponds to one secondary data line in one pixel region and to another secondary data line in another pixel region adjacent to the one pixel region by the switch unit.

In one embodiment, the switch unit has a plurality of selectors and each of the selectors further includes a first control transistor and a second control transistor. The first control transistor has a first source, a first drain and a first gate wherein the first source couples to the one primary data line, the first drain couples to the one secondary data line in the one pixel region, and a first switch signal of the switch unit triggers the first gate of the first control transistor for transmitting the data signal of the one primary data line to the one secondary data line. The second control transistor has a second source, a second drain and a second gate wherein the second source couples to the first source and the one primary data line, the second drain couples to the another secondary data line in the another pixel region, and a second switch signal of the switch unit triggers the second gate of the second control transistor for transmitting the data signal of the one primary data line to the another secondary data line.

In one embodiment, the first switch signal and the second switch signal are inverse phase. In one embodiment, the one primary data line corresponds to one odd secondary data line in the one pixel region and to another even secondary data line in the another pixel region adjacent to the one pixel region by the switch unit.

In the present invention, a driving method of array substrate applicable to LCD panel, wherein the array substrate has a gate driver, a source driver and a plurality of pixel regions having an array configuration in form of rows and columns, the driving method comprising the steps of:

(a) generating a column data signal for outputting the column data signal to a switch unit via a plurality of primary data lines by the source driver;

(b) applying a first switch signal to the pixel regions via the switch unit to select a plurality of odd column pixel regions wherein the switch unit transmits the column data signal to the odd column pixel regions via a plurality of odd secondary data lines;

(c) generating first row scan signal for outputting the first row scan signal to a row of the pixel regions to switch on the odd pixel regions of the pixel regions, wherein the column data signal is transmitted to the odd pixel regions of the pixel regions;

(d) applying a second switch signal to the pixel regions via the switch unit to select a plurality of even column pixel regions wherein the switch unit transmits the column data signal to the even column pixel regions via a plurality of even secondary data lines, and each of the primary data lines corresponds to one odd secondary data line and to one even secondary data line by the switch unit; and (e) generating second row scan signal for outputting the second row scan signal to the row of the pixel regions to switch on the even pixel regions of the pixel regions, wherein the column data signal is transmitted to the even pixel regions of the pixel regions.

In one embodiment, the switch unit has a plurality of selectors and each of the selectors further comprises a first control transistor having a first source, a first drain and a first gate and a second control transistor having a second source, a second drain and a second gate and wherein a first switch signal of the switch unit triggers the first gate of the first control transistor for transmitting the data signal of the one primary data line to the one secondary data line and a second switch signal of the switch unit triggers the second gate of the second control transistor for transmitting the data signal of the one primary data line to the another secondary data line.

In one embodiment, the first switch signal and the second switch signal are inverse phase either for enabling the first control transistor while the second control transistor disables or for enabling the second control transistor while the first control transistor disables.

In one embodiment, each of pixel region has a thin film transistor (TFT) and a pixel electrode coupled to a drain of the TFT, and a source of the TFT is coupled to a scan line, and wherein when the first switch signal enables the first control transistor, one of two scan lines switches on one TFT in one pixel region for charging one pixel electrode by the column data signal, and when the second switch signal enables the second control transistor, another of the two scan lines switches on another TFT in another pixel region for charging another pixel electrode by the column data signal.

The array substrate and driving method thereof can save the manufacturing cost of the LCD panel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
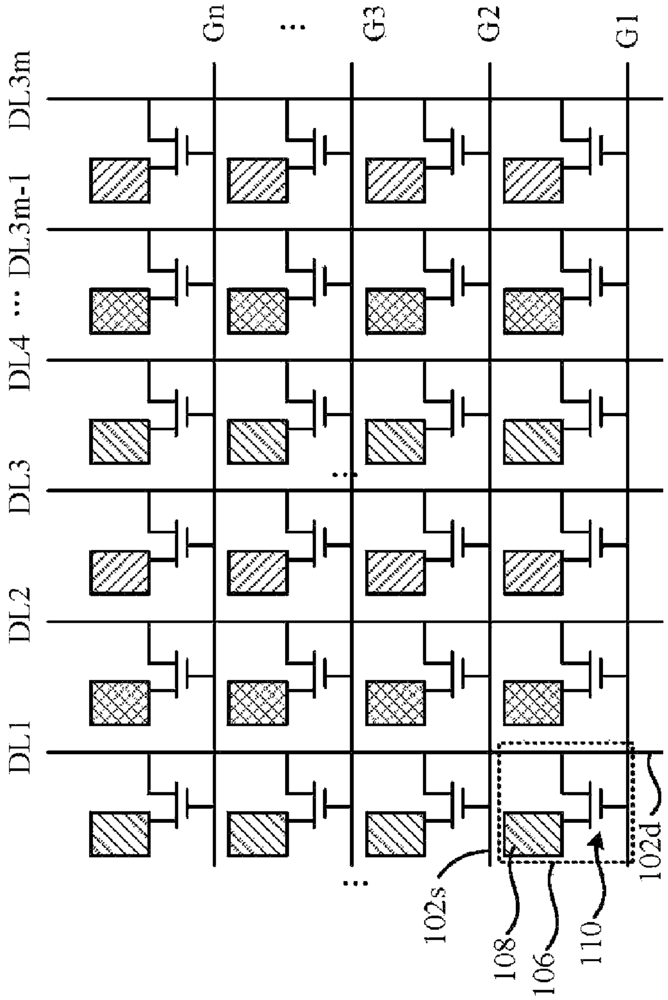
FIG. 1 (Prior Art)
FIG. 1 is a schematic view of conventional driving circuit of LCD panel.
Figure 2:
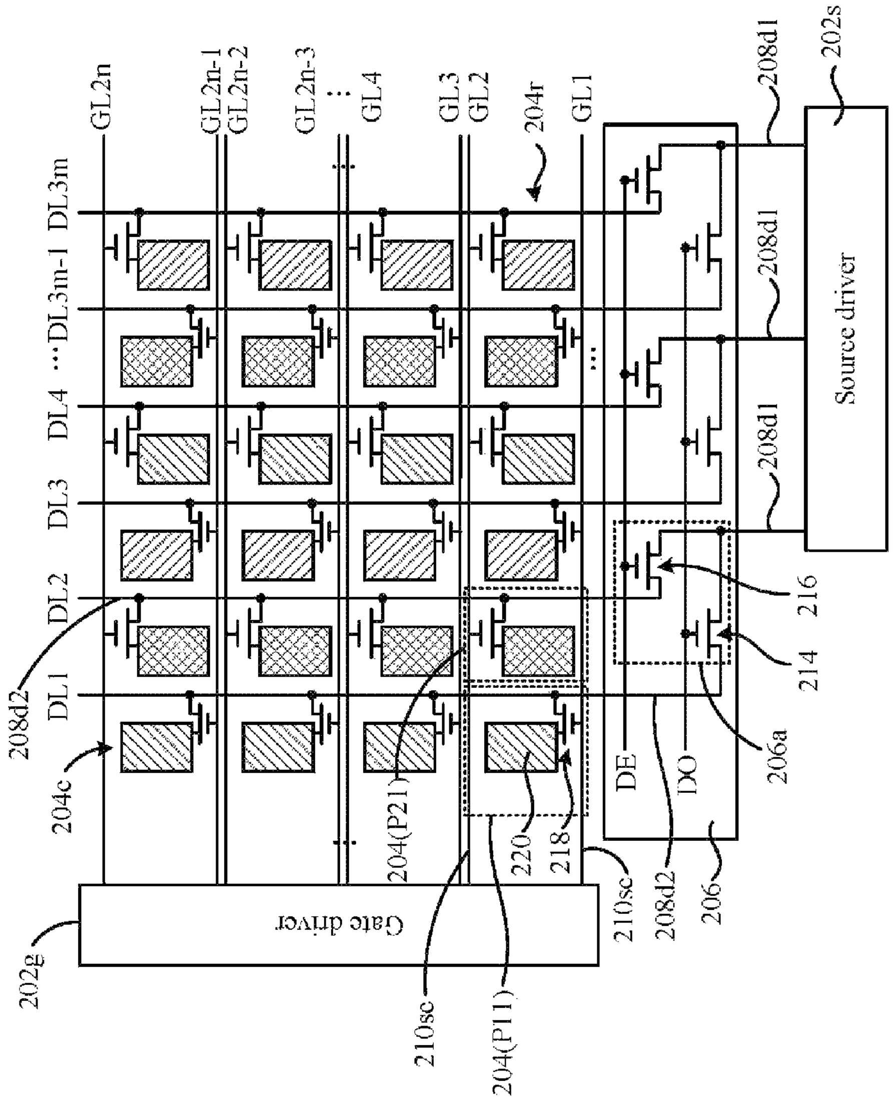
FIG. 2 is a schematic view of driving circuit of array substrate of LCD panel according to one embodiment of the present invention.

FIG. 2 is a schematic view of driving circuit of array substrate 200 of LCD panel according to one embodiment of the present invention. The array substrate 200 applicable to LCD panel includes a gate driver 202*g*, a source driver 202*s*, a plurality of pixel regions 204 and a switch unit 206. The pixel regions 204 are composed of an array configuration in form of rows and columns wherein each of the pixel regions 204 is connected to a secondary data line 208*d*2 and two scan lines 210*sc*. The switch unit 206 is coupled to the source driver 202*s* via a plurality of primary data lines 208*d*1 and coupled to the pixel regions 204 via the secondary data lines 208*d*2 wherein one of the primary data lines 208*d*1 corresponds to one secondary data line 208*d*2 in one pixel region 204 and to another secondary data line 208*d*2 in another pixel region 204 adjacent to the one pixel region 204 by the switch unit 206.

As shown in FIG. 2, the pixel regions 204 forms an array configuration in m by n (m×n) ("m" and "n" being positive integer) including m columns, i.e. m data lines 208*d*2 (DL1 through DL3m) and 2n rows, i.e. 2n scan lines (GL1 through GL2n). The switch unit 206 couples to the pixel regions (m×n) via "m/2" of primary data lines 208*d*1. For example, one primary data lines 208*d*1 outputs data signal to two secondary data lines 208*d*2 of two adjacent pixel regions 204 (P11, P21) respectively via the switch unit 206. That is, the one primary data lines 208*d*1 corresponds to one odd secondary data line 208*d*2 in one pixel region 204 and corresponds to one even secondary data line 208*d*2 in adjacent pixel region 204 by the switch unit 206. In one embodiment, the pixel region 204 further includes three primary colors RGB having red (R) sub-pixel, green (G) sub-pixel and blue (B) sub-pixel. Meanwhile, m secondary data lines are changed to be 3m secondary data lines, as shown in FIG. 2.

In one embodiment, the switch unit 206 has a plurality of selectors 206*a* and each of the selectors 206*a* further includes a first control transistor 214 and a second control transistor 216. The first control transistor 214 has a first source, a first drain and a first gate wherein the first source couples to the one primary data line 208*d*1, the first drain couples to the one secondary data line 208*d*2 in the one pixel region 204, and a first switch signal "DO" of the switch unit 206 triggers the first gate of the first control transistor 214 for transmitting the data signal of the one primary data line 208*d*1 to the one secondary data line 208*d*2. The second control transistor 216 has a second source, a second drain and a second gate wherein the second source couples to the first source and the one primary data line 208*d*1, the second drain couples to the another secondary data line 208*d*2 in the another pixel region 204, and a second switch signal "DE" of the switch unit 206 triggers the second gate of the second control transistor 216 for transmitting the data signal of the one primary data line 208*d*1 to the another secondary data line 208*d*2. In other words, each of the selectors 206*a* utilizes the control transistors as the switch component for controlling the odd secondary data line 208*d*2 and the even secondary data line 208*d*2. Moreover, based on the timing of the data signal inputted to the secondary data line 208*d*2, each row of the pixel regions 204 is driven by two scan lines 210*sc*.

When the resolution of array substrate 200 in the LCD panel is "m×n" and each pixel region is driven by two gates in the array substrate 200, the fan-out amount of the gates and the fan-out amount of the source are 2n and "(3/2)*m", which represents 2n scan lines and the amount "(3/2)*m" of primary data lines 208*d*1. If the channel amount in each gate is "a" ("a" being positive integer) and the channel amount in each source is "b" ("b" being positive integer), the component amount of gate driver 202*g* is "(2*n)/a" and the component amount of source driver 202*s* is "(3/2)*m/b" wherein "/" means division. When the resolution of LCD is increased, the fan-out amount of the source is reduced and the component amount of the source driver 202*s* is thus effectively decreased. Person skilled in the art should be noted that the cost of source driver 202*s* is decreased to advantageously reduce the manufacturing cost of LCD panel while the resolution is higher.

Figure 3:
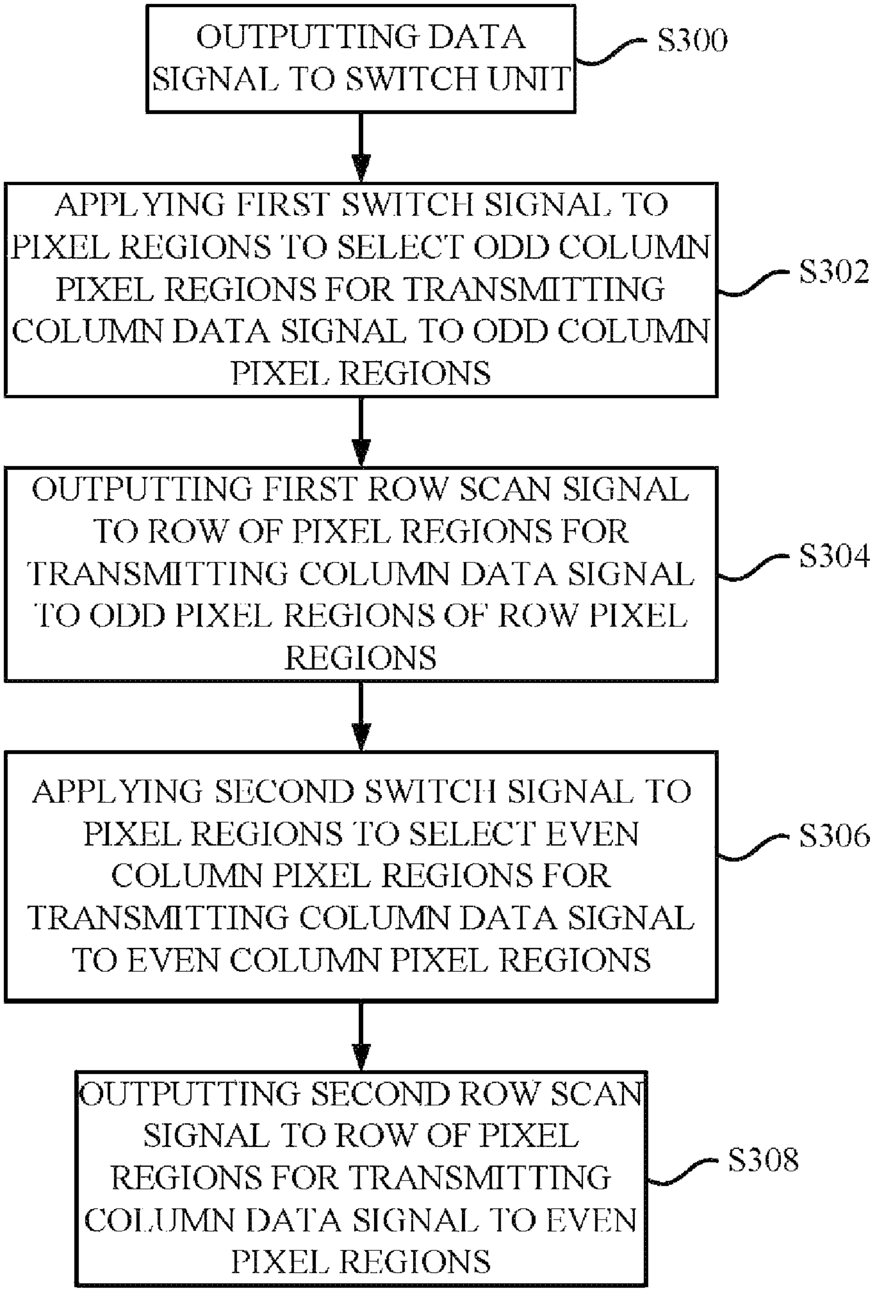
FIG. 3 is a flow chart of driving method of array substrate according to one embodiment of the present invention.

Please refer to FIG. 2 and FIG. 3. FIG. 3 is a flow chart of driving method of array substrate 200 according to one embodiment of the present invention. The driving method of array substrate 200 applicable to LCD panel, wherein the array substrate 200 has a gate driver, a source driver and a plurality of pixel regions 204 having an array configuration in form of rows and columns. The driving method includes the following steps In step S300, the source driver 202*s* generates a column data signal for outputting the column data signal to a switch unit 206 via a plurality of primary data lines 208*d*1.

In step S302, the switch unit 206 applies a first switch signal "DO" to the pixel regions 204 to select a plurality of odd column pixel regions 204*c* wherein the switch unit 206 transmits the column data signal to the odd column pixel regions 204 via a plurality of odd secondary data lines 208*d*2.

In step S304, the gate driver 202*g* generates first row scan signal for outputting the first row scan signal to a row of the pixel regions 204*r* to switch on the odd pixel regions 204 of the row of the pixel regions 204*r*, wherein the column data signal is transmitted to the odd pixel regions 204 of the row of the pixel regions 204*r*.

In step S306, the switch unit 206 applies a second switch signal "DE" to the pixel regions 204 via the switch unit 206 to select a plurality of even column pixel regions 204*c* wherein the switch unit 206 transmits the column data signal to the even column pixel regions 204*c* via a plurality of even secondary data lines 208*d*2, and each of the primary data lines 208*d*1 corresponds to one odd secondary data line 208*d*2 and to one even secondary data line 208*d*2.

In step S306, the gate driver 202*g* generates second row scan signal for outputting the second row scan signal to the row of the pixel regions 204 to switch on the even pixel regions 204 of the pixel regions 204, wherein the column data signal is transmitted to the even pixel regions 204 of the pixel regions 204.

The switch unit 206 has a plurality of selectors 206*a* and each of the selectors 206*a* further includes a first control transistor 214 having a first source, a first drain and a first gate and a second control transistor having a second source, a second drain and a second gate and wherein a first switch signal "DO" of the switch unit 206 triggers the first gate of the first control transistor 214 for transmitting the data signal of the one primary data line 208*d*1 to the one secondary data line 208*d*2 and a second switch signal "DE" of the switch unit 206 triggers the second gate of the second control transistor 216 for transmitting the data signal of the one primary data line 208*d*1 to the another secondary data line 208*d*2.

Figure 4:
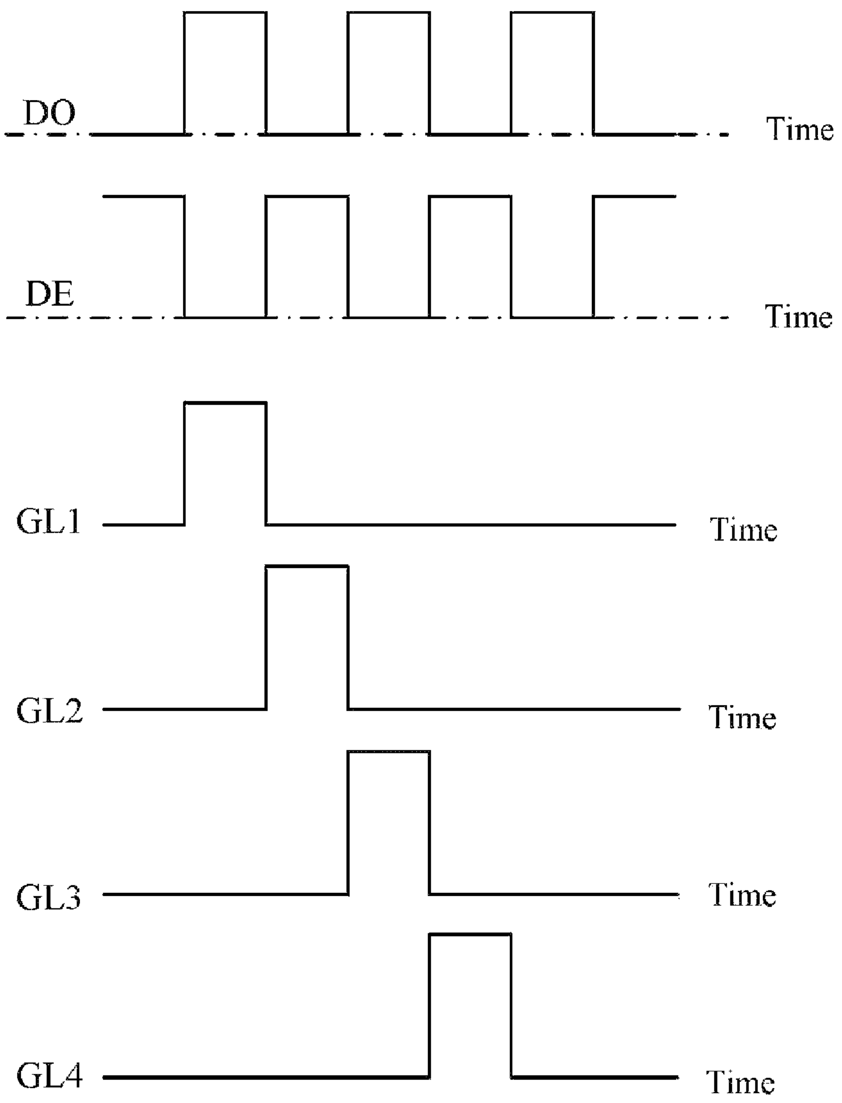
FIG. 4 is timing control waveform of driving method of array substrate according to one embodiment of the present invention.

The first switch signal "DO" and the second switch signal "DE" are inverse phase either for enabling, e.g. high voltage level, the first control transistor 214 while the second control transistor 216 disables, e.g. low voltage level, or for enabling, e.g. high voltage level, the second control transistor 216 while the first control transistor 214 disables, e.g. low voltage level. FIG. 4 is timing control waveform of driving method of array substrate according to one embodiment of the present invention. The horizontal axis represents time and the vertical axis is signal amplitude. The first switch signal "DO" and the second switch signal "DE" are inverse phase.

Each of pixel region 204 has a thin film transistor (TFT) 218 and a pixel electrode 220 coupled to a drain of the TFT 218, and a source of the TFT 218 is coupled to a scan line 210*sc*, and wherein when the first switch signal "DO" enables the first control transistor 214, one of two scan lines 210*sc* switches on one TFT 218 in one pixel region 204 for charging one pixel electrode 220 by the column data signal, and when the second switch signal "DE" enables the second control transistor 216, another of the two scan lines 210*sc* switches on another TFT 218 in another pixel region 204 for charging another pixel electrode by the column data signal.

When the resolution of array substrate 200 in the LCD panel is "m×n" and each pixel region is driven by two gates in the array substrate 200, the fan-out amount of the gates and the fan-out amount of the source are 2n and "(3/2)*m", which represents 2n scan lines and the amount "(3/2)*m" of primary data lines 208*d*1. If the channel amount in each gate is "a" ("a" being positive integer) and the channel amount in each source is "b" ("b" being positive integer), the component amount of gate driver 202*g* is "(2*n)/a" and the component amount of source driver 202*s* is "(3/2)*m/b" wherein "/" means division. When the resolution of LCD is increased, the fan-out amount of the source is reduced and the component amount of the source driver 202*s* is thus effectively decreased. Person skilled in the art should be noted that the cost of source driver 202*s* is decreased to advantageously reduce the manufacturing cost of LCD panel while the resolution is higher.

Based on the above descriptions, the present invention utilizes an array substrate and driving method thereof to save the manufacturing cost of the LCD panel.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An array substrate applicable to a liquid crystal display (LCD) panel, wherein the array substrate has a gate driver, the array substrate further comprising:

a source driver;

a plurality of pixel regions having an array configuration in form of rows and columns, wherein each of the pixel regions is connected to a secondary data line and comprises two scan lines and each row of the pixel regions is driven by the two scan lines; and a switch unit coupled to the source driver via a plurality of primary data lines and coupled to the pixel regions via the secondary data lines, wherein one of the primary data lines corresponds to one secondary data line in one pixel region and to another secondary data line in another pixel region adjacent to the one pixel region by the switch unit;

wherein each of pixel region has a thin film transistor (TFT) and a pixel electrode coupled to a drain of the TFT, and a source of the TFT is coupled to a scan line, and wherein when a first control transistor of the switch unit is enabled, one of two scan lines switches on one TFT in one pixel region in a row of the pixel regions for charging one pixel electrode by the column data signal, and when a second control transistor of the switch unit is enabled, another of the two scan lines switches on another TFT in another pixel region in the row of the pixel regions for charging another pixel electrode by the column data signal.

2. The array substrate of claim 1, wherein the switch unit has a plurality of selectors and each of the selectors further comprises:

a first control transistor having a first source, a first drain and a first gate wherein the first source couples to the one primary data line, the first drain couples to the one secondary data line in the one pixel region, and a first switch signal of the switch unit triggers the first gate of the first control transistor for transmitting the data signal of the one primary data line to the one secondary data line; and a second control transistor having a second source, a second drain and a second gate wherein the second source couples to the first source and the one primary data line, the second drain couples to the another secondary data line in the another pixel region, and a second switch signal of the switch unit triggers the second gate of the second control transistor for transmitting the data signal of the one primary data line to the another secondary data line.

3. The array substrate of claim 2, wherein the first switch signal and the second switch signal are inverse phase.

4. The array substrate of claim 1, wherein the one primary data line corresponds to one odd secondary data line in the one pixel region and to the another even secondary data line in the another pixel region adjacent to the one pixel region by the switch unit.

5. A driving method of array substrate applicable to LCD panel, wherein the array substrate has a gate driver, a source driver and a plurality of pixel regions having an array configuration in form of rows and columns, the driving method comprising the steps of:

(a) generating a column data signal for outputting the column data signal to a switch unit via a plurality of primary data lines by the source driver, wherein each of the pixel regions is connected to a secondary data line and comprises two scan lines and each row of the pixel regions is driven by the two scan lines;

(b) applying a first switch signal to the pixel regions via the switch unit to select a plurality of odd column pixel regions wherein the switch unit transmits the column data signal to the odd column pixel regions via a plurality of odd secondary data lines;

(c) generating first row scan signal for outputting the first row scan signal to a row of the pixel regions to switch on the odd pixel regions of the pixel regions by the gate driver, wherein the column data signal is transmitted to the odd pixel regions of the pixel regions;

(d) applying a second switch signal to the pixel regions via the switch unit to select a plurality of even column pixel regions by the switch unit wherein the switch unit transmits the column data signal to the even column pixel regions via a plurality of even secondary data lines, and each of the primary data lines corresponds to one odd secondary data line and to one even secondary data line; and (e) generating second row scan signal for outputting the second row scan signal to the row of the pixel regions to switch on the even pixel regions of the pixel regions by the gate driver, wherein the column data signal is transmitted to the even pixel regions of the pixel regions;

wherein each of pixel region has a thin film transistor (TFT) and a pixel electrode coupled to a drain of the TFT, and a source of the TFT is coupled to a scan line, and wherein when the first switch signal enables a first control transistor, one of two scan lines corresponding to the first row scan signal switches on one TFT in one pixel region for charging one pixel electrode by the column data signal, and when the second switch signal enables a second control transistor, another of the two scan lines corresponding to the second row scan signal switches on another TFT in another pixel re ion for char in another pixel electrode by the column data signal.

6. The driving method of claim 5, wherein the switch unit has a plurality of selectors and each of the selectors further comprises the first control transistor having a first source, a first drain and a first gate and the second control transistor having a second source, a second drain and a second gate and wherein a first switch signal of the switch unit triggers the first gate of the first control transistor for transmitting the data signal of the one primary data line to the one secondary data line and a second switch signal of the switch unit triggers the second gate of the second control transistor for transmitting the data signal of the one primary data line to the another secondary data line.

7. The driving method of claim 6, wherein the first switch signal and the second switch signal are inverse phase either for enabling the first control transistor while the second control transistor disables or for enabling the second control transistor while the first control transistor disables.

* * * * *